US011913250B2

(12) United States Patent
Lee

(10) Patent No.: US 11,913,250 B2

(45) Date of Patent: Feb. 27, 2024

(54) TUBULAR LOCK FOR PUSH LOCKING

(71) Applicant: ABA LOCKS INTERNATIONAL CO., LTD., New Taipei (TW)

(72) Inventor: Miko Lee, New Taipei (TW)

(73) Assignee: ABA Locks International Co., Ltd., New Taipei (TW)

(*) Notice: Subject to any disclaimer, the term of this patent is extended or adjusted under 35 U.S.C. 154(b) by 427 days.

(21) Appl. No.: 17/407,192

(22) Filed: Aug. 20, 2021

(65) Prior Publication Data

US 2023/0054352 A1 Feb. 23, 2023

(51) Int. Cl.

| | |
|---|---|
| ***E05B 27/08*** | (2006.01) |
| ***E05B 19/00*** | (2006.01) |
| ***E05B 9/04*** | (2006.01) |
| ***E05B 27/00*** | (2006.01) |
| *E05B 65/46* | (2017.01) |

(52) U.S. Cl.

CPC ........ *E05B 27/083* (2013.01); *E05B 19/0047* (2013.01); *E05B 27/001* (2013.01); *E05B 27/08* (2013.01); *E05B 27/0085* (2013.01); *E05B 65/46* (2013.01); *E05B 2009/046* (2013.01)

(58) Field of Classification Search

CPC .. E05B 9/04; E05B 2009/046; E05B 19/0047; E05B 27/001; E05B 27/083; E05B 65/46

See application file for complete search history.

(56) References Cited

U.S. PATENT DOCUMENTS 4,233,828 A * 11/1980 Dauenbaugh ......... E05B 27/083 70/491
5,133,203 A * 7/1992 Huang .................. E05B 13/105 70/491
5,400,629 A * 3/1995 Myers .................. E05B 27/083 70/491
5,517,840 A 5/1996 Haggstrom
6,038,898 A * 3/2000 Cliff ..................... E05B 27/083 70/491
6,718,808 B2 * 4/2004 Yu ......................... E05B 27/083 70/491

(Continued)

FOREIGN PATENT DOCUMENTS

CN 208564218 U 3/2019
TW 182882 4/1992

(Continued)

*Primary Examiner* — Christopher J Boswell

(74) *Attorney, Agent, or Firm* — Snell & Wilmer L.L.P.

(57) ABSTRACT

A tubular lock for push locking has a lock housing, a switching handle mounted in a front end portion of the lock housing, an upper pin seat and a lower pin seat mounted in the lock housing and the switching handle, and multiple pin assemblies and a core shaft mounted in the upper pin seat and the lower pin seat. A key is only needed when unlocking the tubular lock, and then the tubular lock can be locked by pushing the core shaft. The tubular lock can be used to latch a pivotal mechanism. When the tubular lock is in an unlocking state, the user can switch the latch to the locking angular position or an unlocking angular position by turning the switching handle without using the key. Therefore, flexibility and convenience in using the tubular lock can be efficiently improved.

20 Claims, 13 Drawing Sheets

(56) References Cited

U.S. PATENT DOCUMENTS

| | | | | |
|---|---|---|---|---|
| 7,171,833 | B1 * | 2/2007 | Wu | E05B 27/083 70/491 |
| 7,475,579 | B2 * | 1/2009 | Miao | E05B 27/083 70/490 |
| 7,685,854 | B2 * | 3/2010 | Xu | E05B 27/083 70/491 |
| 2006/0096344 | A1 * | 5/2006 | Lee | E05B 27/083 70/491 |

FOREIGN PATENT DOCUMENTS

| | | |
|---|---|---|
| TW | 253443 | 8/1995 |
| TW | I268300 | 12/2006 |
| TW | I269825 | 1/2007 |

* cited by examiner

TUBULAR LOCK FOR PUSH LOCKING

BACKGROUND OF THE INVENTION

1. Field of the Invention

The present invention relates to a tubular lock, especially to a tubular lock that is able to latch a pivotal mechanism and can be switched to open or to close under an unlocking state.

2. Description of the Prior Art(s)

A lock is a device used to prevent important items from being stolen or to prevent specific places from being invaded by thieves. After centuries of improvement, locks with various forms and functions have been developed. A push-type tubular lock is one of the common type of the locks. Generally, the push-type tubular lock are used to lock a linearly moving mechanism, such as drawers, sliding doors, sliding windows and the like, to prevent the drawers, the sliding doors, and the sliding windows from being opened.

A conventional push-type tubular lock has a core shaft. When the conventional push-type tubular lock is in a locking state, the core shaft protrudes backward from a rear end of the conventional push-type tubular lock, such that a rear end of the core shaft engages with the linearly moving mechanism. When the conventional push-type tubular lock is unlocked by a key, the core shaft protrudes forward from a front end of the conventional push-type tubular lock, such that the rear end of the core shaft is retracted to disengage from the linearly moving mechanism. After that, a user can switch the conventional push-type tubular lock to the locking state by pushing the core shaft from the front end of the conventional push-type tubular lock. In other words, the key is only needed when unlocking the conventional push-type tubular lock, and the key is not needed when locking the conventional push-type tubular lock. Therefore, there is no need in finding the key before locking the conventional push-type tubular lock, and the possibility of losing the key due to repeatedly taking out the key can be avoided.

However, as mentioned above, the conventional push-type tubular lock is only able to be used in latching the linearly moving mechanism, and is unable to be used in latching a pivotal mechanism, such as a window that is hinged to a window frame or a door that is hinged to a door frame. In addition, although the key is only needed when unlocking the conventional push-type tubular lock, the key is needed when switching the conventional push-type tubular lock between an engaging state and a disengaging state. The conventional push-type tubular lock is unable to temporarily engage with or disengage from the linearly moving mechanism.

To overcome the shortcomings, the present invention provides a tubular lock for push locking to mitigate or obviate the aforementioned problems.

SUMMARY OF THE INVENTION

The main objective of the present invention is to provide a tubular lock for push locking. The tubular lock comprises a lock housing, a switching handle, an upper pin seat, a lower pin seat, multiple pin assemblies, and a core shaft. The lock housing has at least one positioning recess formed in an inner sidewall of the lock housing.

The switching handle has a rear end portion and at least one positioning hole. The rear end portion is rotatably mounted in a front end portion of the lock housing. The at least one positioning hole of the switching handle is radially formed through the rear end portion of the switching handle. Each of the at least one positioning hole of the switching handle selectively corresponds in position to one of the at least one positioning recess of the lock housing.

The upper pin seat is rotatably mounted in the switching handle and disposed in a front end portion of the switching handle. The upper pin seat has a mounting hole axially formed in the upper pin seat.

The lower pin seat is mounted through a rear end portion of the lock housing and the rear end portion of the switching handle, abuts against a rear end surface of the upper pin seat and is securely connected with the switching handle. The lower pin seat has a receiving recess, at least one positioning hole, and at least one limiting pin. The receiving recess is formed in a front end surface of the lower pin seat. The at least one positioning hole of the lower pin seat is radially formed through the lower pin seat and communicates with the receiving recess. Each of the at least one positioning hole of the lower pin seat aligns with one of the at least one positioning hole of the switching handle. Each of the at least one limiting pin is mounted in one of the at least one positioning hole of the lower pin seat and one of the at least one positioning hole of the switching handle that align with each other. A length of each of the at least one limiting pin is longer a sum of a depth of a respective one of the at least one positioning hole of the lower pin seat and a depth of a respective one of the at least one positioning hole of the switching handle.

The pin assemblies are mounted in the upper pin seat and the lower pin seat, and are separately arranged around the mounting hole of the upper pin seat and around the receiving recess of the lower pin seat.

The core shaft is slidably mounted through the receiving recess of the lower pin seat and the mounting hole of the upper pin seat, engages with the upper pin seat and selectively engages with the lower pin seat. The core shaft has a buffer annular groove formed in a rear end of the core shaft. A main resilient element pushes the core shaft to protrude forwardly toward the front end portion of the switching handle.

When the lower pin seat is at a locking angular position and the lock core engages with the lower pin seat, the core shaft is able to disengage from the pin seat by turning the core shaft, so as to allow the main resilient element to push the core shaft to protrude out from the front end portion of the switching handle and the buffer annular groove to correspond in position to the at least one limiting pin. When the lower pin seat is at the locking angular position and the lock core disengages from the lower pin seat, the core shaft and the lower pin seat is able to engage with each other by pushing the core shaft to compress the main resilient element.

A key is only needed when unlocking the tubular lock, and then the tubular lock can be locked by pushing the core shaft. The tubular lock can be used to latch a pivotal mechanism. In addition, when the tubular lock is in the unlocking state, the user can switch a latch to the locking angular position or an unlocking angular position by turning the switching handle without using the key. The user only needs to lock the tubular lock before leaving. Therefore, flexibility and convenience in using the tubular lock can be efficiently improved.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
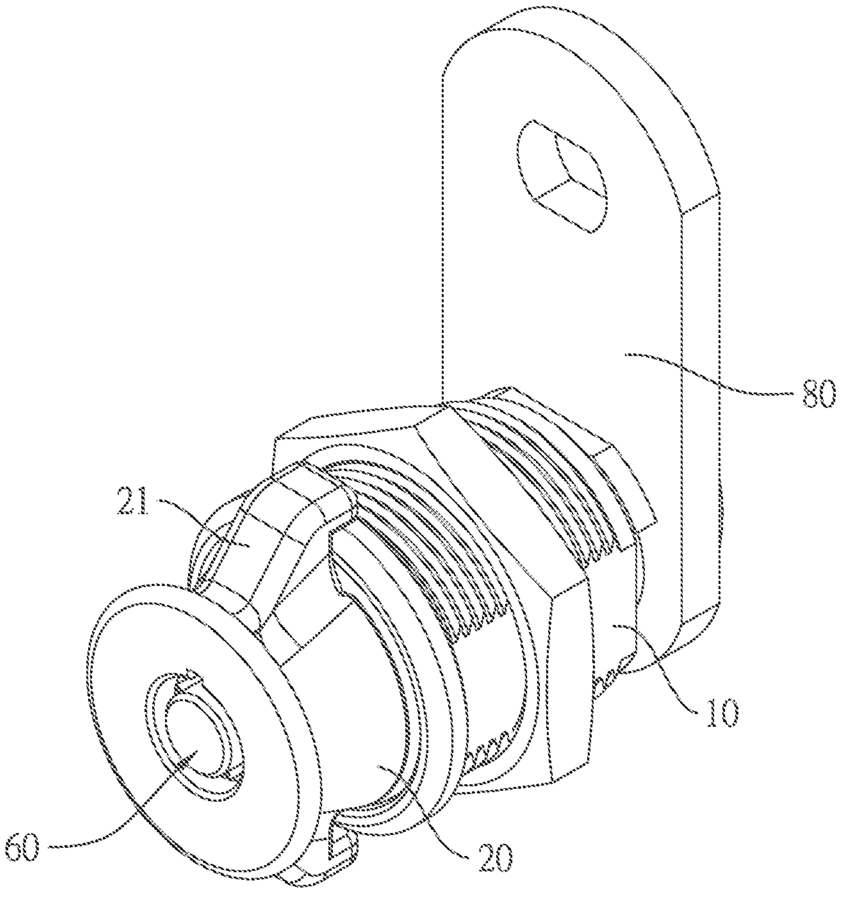
FIG. 1 is a perspective view of a tubular lock for push locking in accordance with the present invention, shown locked.
Figure 4:
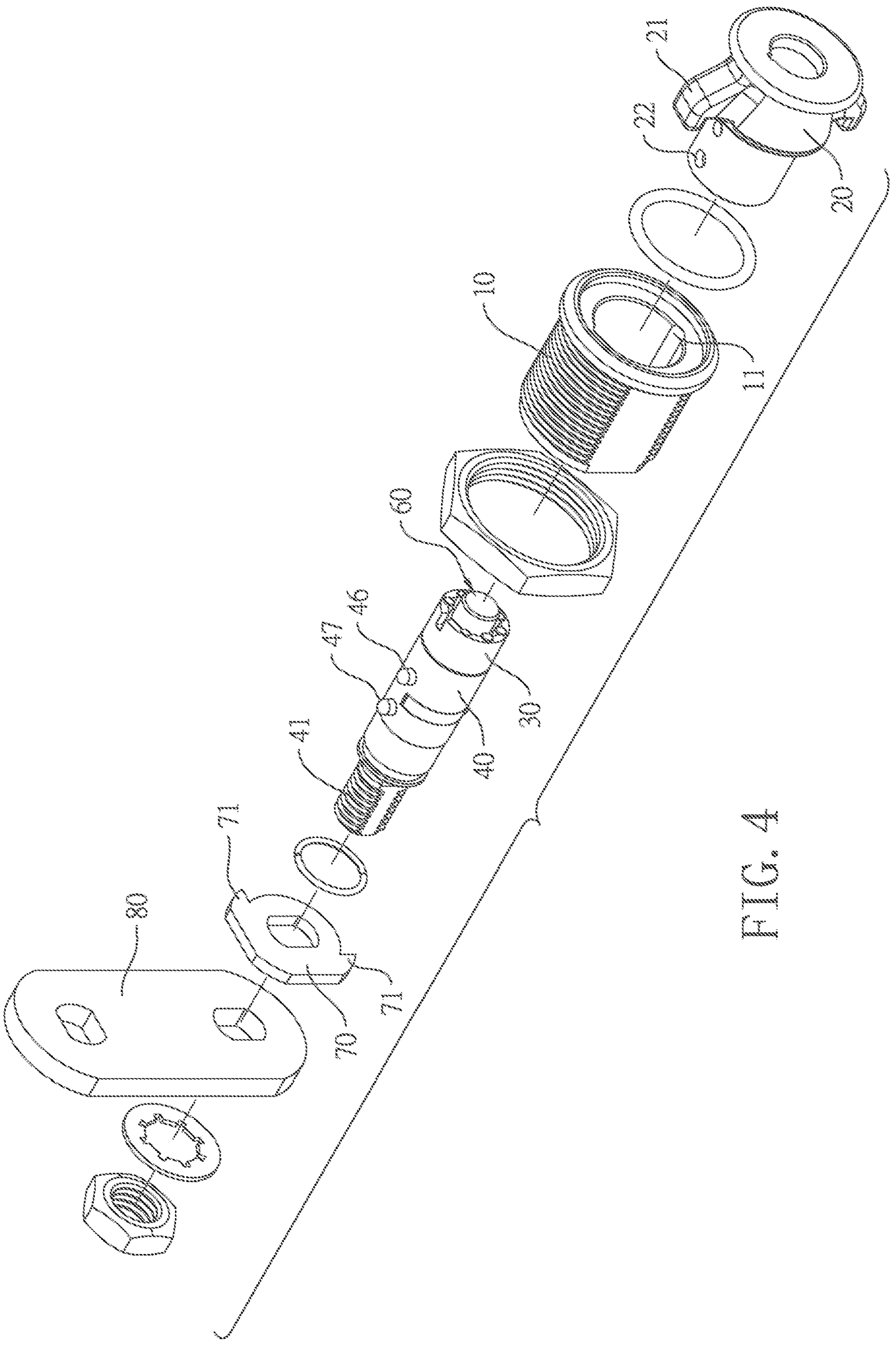
FIG. 4 is an exploded perspective view of the tubular lock in FIG. 1.
Figure 5:
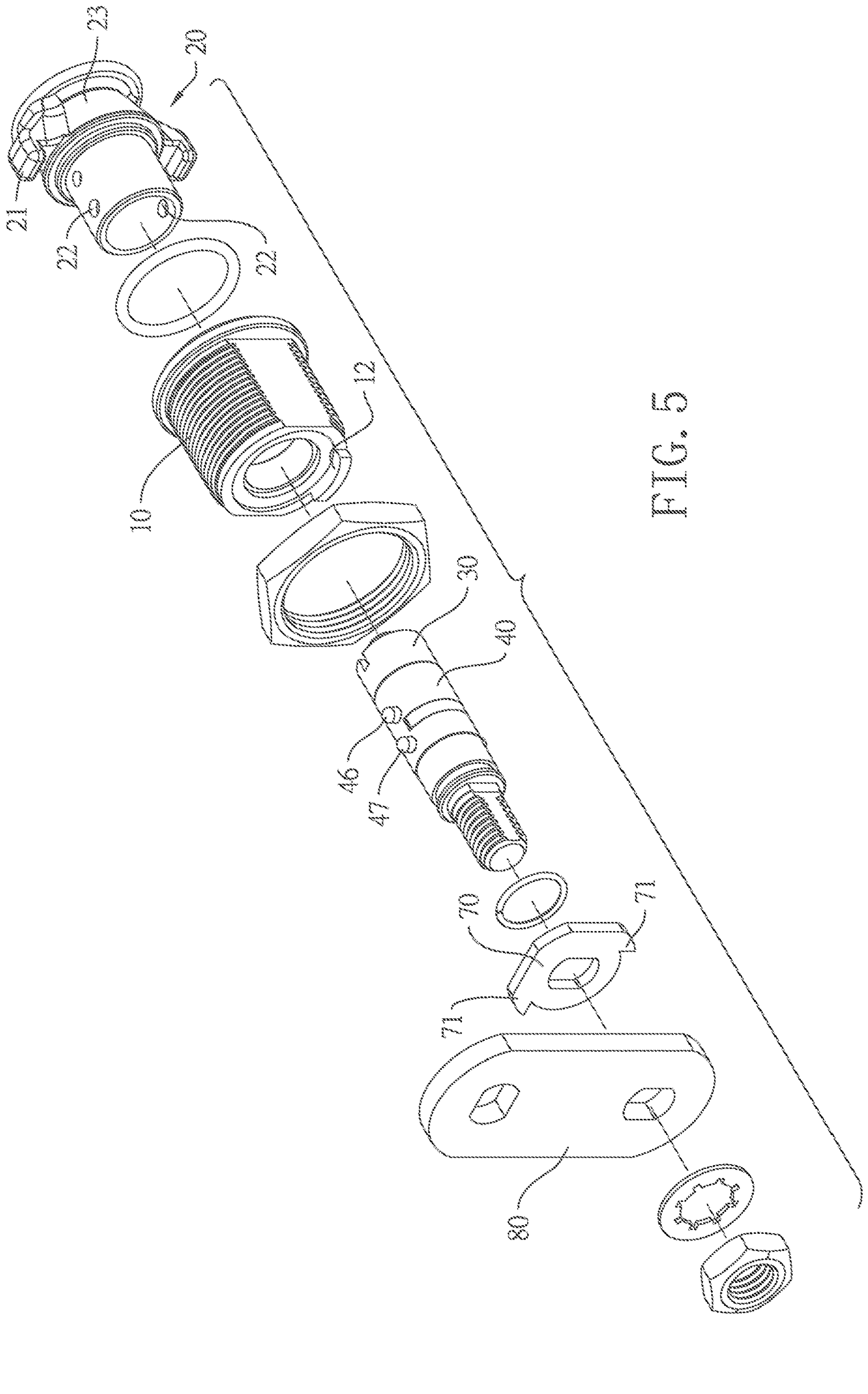
FIG. 5 is another exploded perspective view of the tubular lock in FIG. 1.
Figure 6:
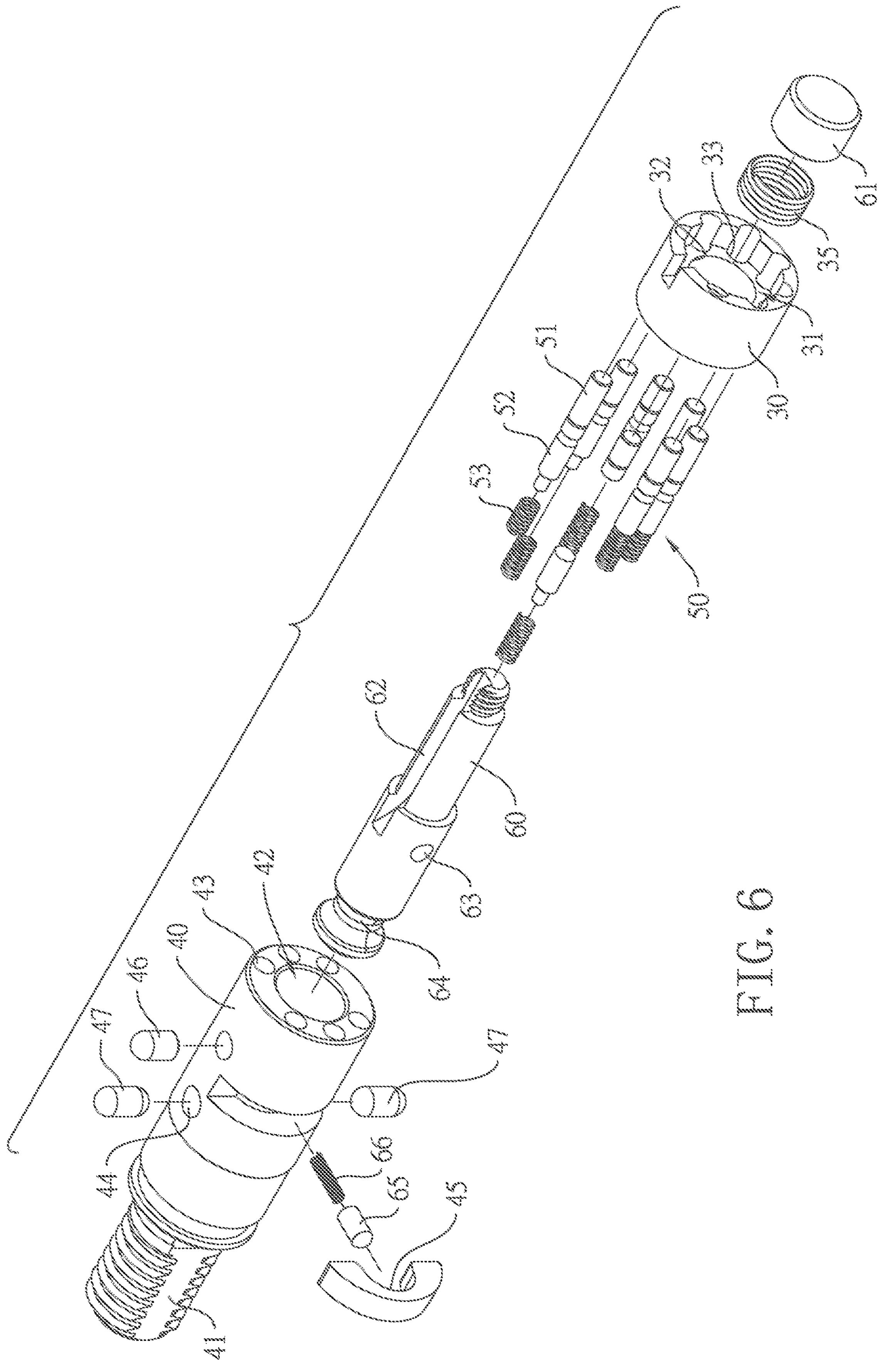
FIG. 6 is an enlarged exploded perspective view of the tubular lock in FIG. 1.

With reference to FIGS. 1, 4 and 6, a tubular lock for push locking in accordance with the present invention comprises a lock housing 10, a switching handle 20, an upper pin seat 30, a lower pin seat 40, multiple pin assemblies 50, a core shaft 60, a limiting ring 70, and a latch 80. The term "axial direction" described in the follows means an extension direction extending along the switching handle 20, the lock housing 10, the upper pin seat 30, the lower pin seat 40, and the limiting ring 40. The term "radial direction" means a direction that is perpendicular to said axial direction.

With further reference to FIGS. 4, 5, 8 and 9, the lock housing 10 is substantially tubular and has a front end portion, a rear end portion, at least one positioning recess 11, and a stop protrusion 12. The at least one positioning recess 11 is formed in an inner sidewall of the lock housing 10. In the preferred embodiment, each of the at least one positioning recess 11 is formed as an elongated groove with two opposite ends of the positioning recess 11 extending toward the front end portion of the lock housing 10 and the rear end portion of the lock housing 10 respectively. The stop protrusion 12 protrudes from the rear end portion of the locking housing 10 along the axial direction.

The switching handle 20 is also substantially tubular and has a front end portion, a rear end portion, at least one holding portion 21, at least one positioning hole 22, and an outer annular groove 23. The rear end portion of the switching handle 20 is rotatably mounted in the front end portion of the lock housing 10. The at least one holding portion 21 protrudes from an outer sidewall of the front end portion of the switching handle 20 along the radial direction. In other words, the at least one holding portion 21 is disposed outside the lock housing 10. In the preferred embodiment, the at least one holding portion 21 includes two holding portions 21 that are oppositely disposed on the switching handle 20. The at least one positioning hole 22 of the switching handle 20 is formed through the rear end portion of the switching handle 20 along the radial direction. In other words, the at least one positioning hole 22 of the switching handle 20 is disposed inside the lock housing 10. Each of the at least one positioning hole 22 of the switching handle 20 selectively corresponds in position to one of the at least one positioning recess 11 of the lock housing 10. The outer annular groove 23 is formed in the outer sidewall of the front end portion of the switching handle 20 and is disposed between the at least one holding portion 21 and a front end surface of the switching handle 20.

Figure 7:
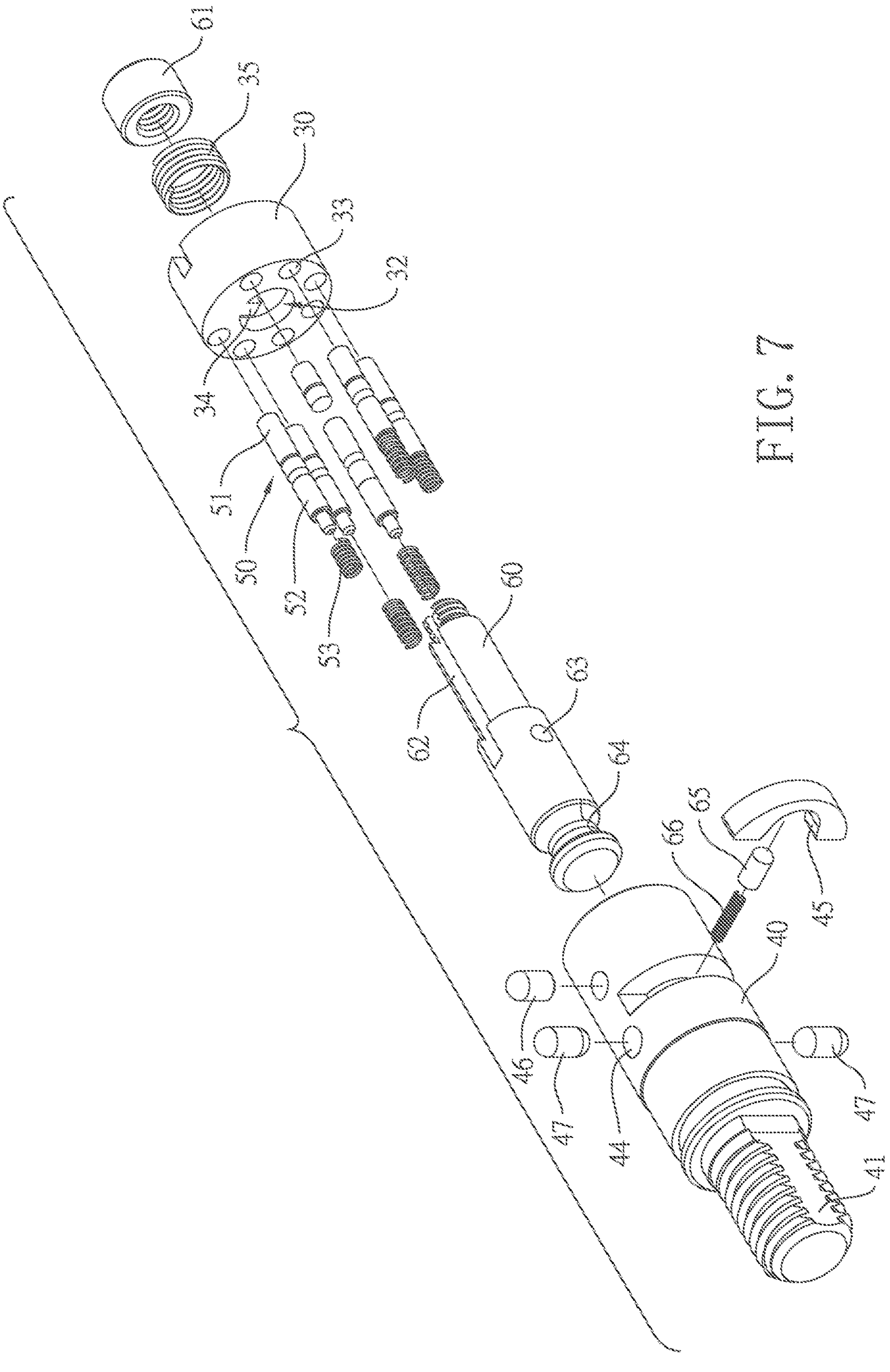
FIG. 7 is another enlarged exploded perspective view of the tubular lock in FIG. 1.

With further reference to FIGS. 6 and 7, the upper pin seat 30 is rotatably mounted in the switching handle 20 and is disposed in the front end portion of the switching handle 20. The upper pin seat 30 has an axial recess 31, a mounting hole 32, multiple upper pin holes 33, and an aligning protrusion 34. The axial recess 31 is formed in a front end surface of the upper pin seat 30. The mounting hole 32 is formed in a bottom defined in the axial recess 31, extends along the axial direction, and is defined through a rear end surface of the upper pin seat 30. A main resilient element 35 is mounted in the mounting hole 32. In the preferred embodiment, the main resilient element 35 is a compression spring. The upper pin holes 33 are separately arranged around the axial recess 31 and around the mounting hole 32. Each of the upper pin holes 33 is defined through the front end surface of the upper pin seat 30 and the rear end surface of the upper pin seat 30. The aligning protrusion 34 protrudes from a hole wall defined around the mounting hole 32 and protrudes along the radial direction.

The lower pin seat 40 is mounted through the rear end portion of the lock housing 10 and the rear end portion of the switching handle 20, abuts against the rear end surface of the upper pin seat 30, and is securely connected with the switching handle 20. In the preferred embodiment, a fastening pin 46 is mounted through the switching handle 20 in the radial direction and is embedded in the lower pin seat 40, such that the switching handle 20 and the lower pin seat 40 are securely connected with each other. The lower pin seat 40 has a mounting end 41, a receiving recess 42, multiple lower pin recesses 43, at least one positioning hole 44 and an engaging recess 45.

The mounting end 41 protrudes out of the lock housing 10 from a rear end surface of the lock housing 10. The receiving recess 42 is formed in a front end surface of the lower pin seat 40. The lower pin recesses 43 are formed in the front end surface of the lower pin seat 40, are separately arranged around the receiving recess 42, and align with the upper pin holes 33 of the upper pin seat 30 respectively.

The at least one positioning hole 44 of the lower pin seat 40 is formed through the lower pin seat 40 along the radial direction and communicates with the receiving recess 42. Each of the at least one positioning hole 44 of the lower pin seat 40 aligns with one of the at least one positioning hole 22 of the switching handle 20. The lower pin seat 40 is further provided with at least one limiting pin 47. Each of the at least one limiting pin 47 is mounted in one of the at least one positioning hole 44 of the lower pin seat 40 and one of the at least one positioning hole 22 of the switching handle 20 that align with each other. A length of each of the at least one limiting pin 47 is longer a sum of a depth of a respective one of the at least one positioning hole 44 of the lower pin seat 40 and a depth of a respective one of the at least one positioning hole 22 of the switching handle 20.

In the preferred embodiment, the at least one positioning recess 11 of the lock housing 10 includes two positioning recesses 11 that are oppositely disposed on the lock housing 10, the at least one positioning hole 22 of the switching handle 20 includes two positioning hoes 22 that are oppositely disposed on the switching handle 20, and the at least one positioning hole 44 of the lower pin seat 40 also includes two positioning holes 44 that are oppositely disposed on the lower pin seat 40. The two positioning holes 22 of the switching handle 20 align with the two positioning holes 44 of the lower pin seat 40 respectively. Moreover, by turning the switching handle 20, the two positioning holes 22 of the switching handle 20 selectively correspond in position to the two positioning recesses 11 of the lock housing 10 respectively.

Figure 8:
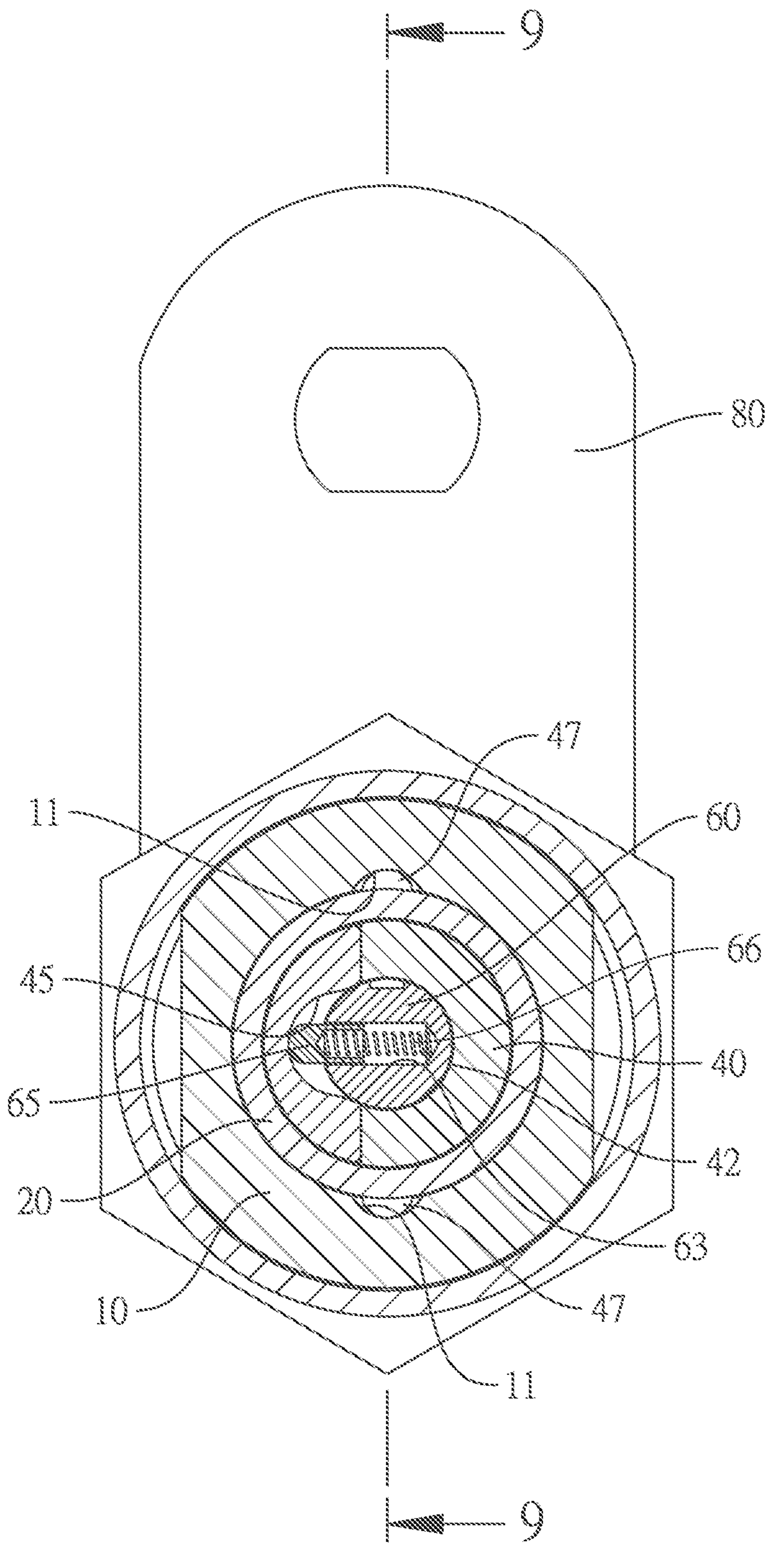
FIG. 8 is a cross-sectional front view of the tubular lock in FIG. 1, shown locked.

With further reference to FIG. 8, the engaging recess 45 are formed in an inner sidewall defined around the receiving recess 42. A bottom defined in the engaging recess 45 is formed as a concave surface.

The pin assemblies 50 are mounted in the upper pin seat 30 and the lower pin seat 40, and are separately arranged around the mounting hole 32 of the upper pin seat 30 and around the receiving recess 42 of the lower pin seat 40. Each of the pin assemblies 50 is mounted in one of the upper pin holes 33 and one of the lower pin recesses 43 that align with each other. Each of the pin assemblies 50 includes an upper pin 51, a lower pin 52, and an axial resilient element 53. The upper pin 51 is mounted in the upper pin hole 33. The lower pin 52 and the axial resilient element 53 are mounted in the lower pin recess 43. The axial resilient element 53 is disposed between the lower pin 52 and a bottom defined in the lower pin recess 43, such that two ends of the axial resilient element 53 abut against the lower pin 52 and the bottom defined in the lower pin recess 43 to push the lower pin 52 and the upper pin 51 to move toward the front end surface of the upper pin seat 30. In the preferred embodiment, the axial resilient element 53 is a compression spring.

The core shaft 60 is mounted through the receiving recess 42 of the lower pin seat 40 and the mounting hole 32 of the upper pin seat 30, and is slidable between an engaging position and a disengaging position. The core shaft 60 engages with the upper pin seat 30 and selectively engages with the lower pin seat 40. The core shaft 60 has a head 61, a sliding recess 62, a radial recess 63, and a buffer annular groove 64.

The head 61 is disposed on a front end of the core shaft 60 and is mounted in the axial recess 31 of the upper pin seat 30. Two opposite ends of the main resilient element 35 that is mounted in the mounting hole 32 abut against the upper pin seat 30 and the head 61 of the core shaft 60. In the preferred embodiment, the head 61 is detachably mounted on the front end of the core shaft 60.

The sliding recess 62 is formed in an outer side surface of the core shaft 60, extends along the axial direction, and has two ends positioned toward the front end of the core shaft 60 and a rear end of the core shaft 60 respectively. The aligning protrusion 34 of the upper pin seat 30 protrudes in the sliding recess 62. Thus, the core shaft 60 is limited to be only slidable along the axial direction in the receiving recess 42 of the lower pin seat 40 and does not rotate relative to the lower pin seat 40.

The radial recess 63 is radially formed in the outer side surface of the core shaft 60 and is provided with a positioning pin 65 and a radial resilient element 66. The radial resilient element 66 is mounted between the positioning pin 65 and a bottom defined in the radial resilient element 63. When the core shaft 60 is disposed at the engaging position, the radial recess 63 corresponds in position to the engaging recess 45 of the lower pin seat 40 and the radial resilient element 66 pushes the positioning pin 65 to protrude into the engaging recess 45 of the lower pin seat 40.

The buffer annular groove 64 is formed in the outer side surface of the core shaft 60 and is disposed between the radial recess 63 and the rear end of the core shaft 60.

The limiting ring 70 is securely mounted on the mounting end 41 of the lower pin seat and has two limiting protrusions 71. The two limiting protrusions 71 separately protrude radially from an outer peripheral edge of the limiting ring 70. The stop protrusion 12 of the lock housing 10 is disposed between the two limiting protrusions 71. When the lower pin seat 40 is driven to rotate, a rotating angle of the lower pin seat 40 can be limited with one of the limiting protrusions 71 of the limiting ring 70 abutting against the stop protrusion 12 of the lock housing 10.

The latch is securely mounted on the mounting end 41 of the lower pin seat 40. The limiting ring 70 is disposed between the latch 80 and the rear end portion of the lock housing 10. When the lower pin seat 40 is driven to rotate, the latch 80 rotates along with the lower pin seat 40 to be selectively switched to a locking angular position and an unlocking angular position.

Figure 9:
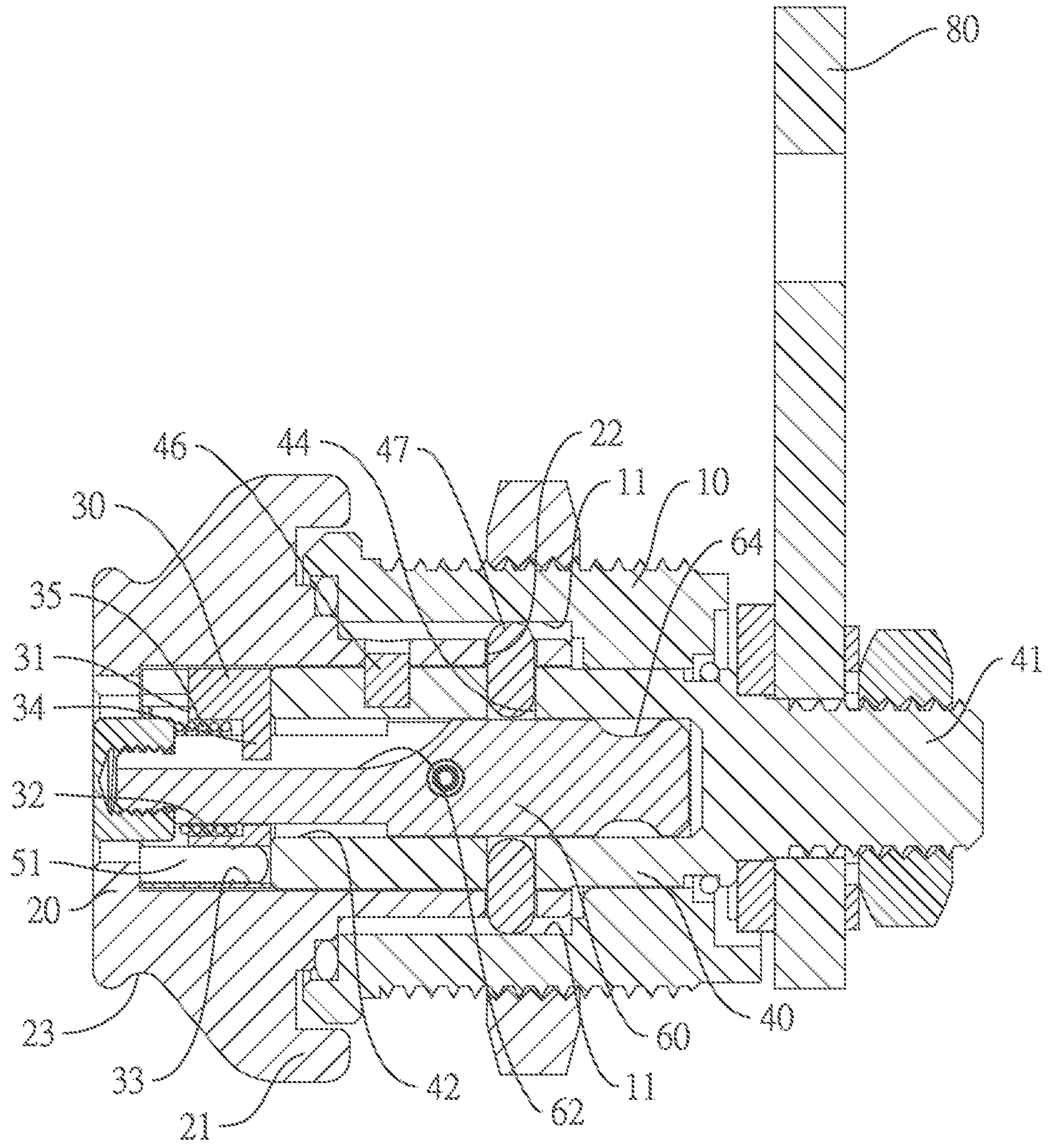
FIG. 9 is a cross-sectional front view along line 9-9 of the tubular lock in FIG. 8.

With reference to FIGS. 1, 8, and 9, when the tubular lock of the present invention is in a locking state: the latch 80 is switched to the locking angular position; an interface between the upper pins 51 and the lower pin 52 of each of the pin assemblies 50 and an interface between the upper pin seat 30 and the lower pin seat 40 are not on the same plane, such that the lower pin seat 40 and the switching handle 20 are unable to rotate relative to the lock housing 10; the positioning pin 65 protrudes in the engaging recess 45 of the lower pin seat 40, such that the core shaft 60 is stably stayed at the engaging position in the receiving recess 42 of the lower pin seat 40 and compress the main resilient element 35; and each of the at least one limiting pin 47 that is mounted through the respective one of the at least one positioning hole 44 of the lower pin seat 40 and the respective one of the at least one positioning hole of the switching handle 20 is pushed by the outer side surface of the core shaft 60 and protrudes in a respective one of the at least one positioning recess 11 of the lock housing 10.

Figure 2:
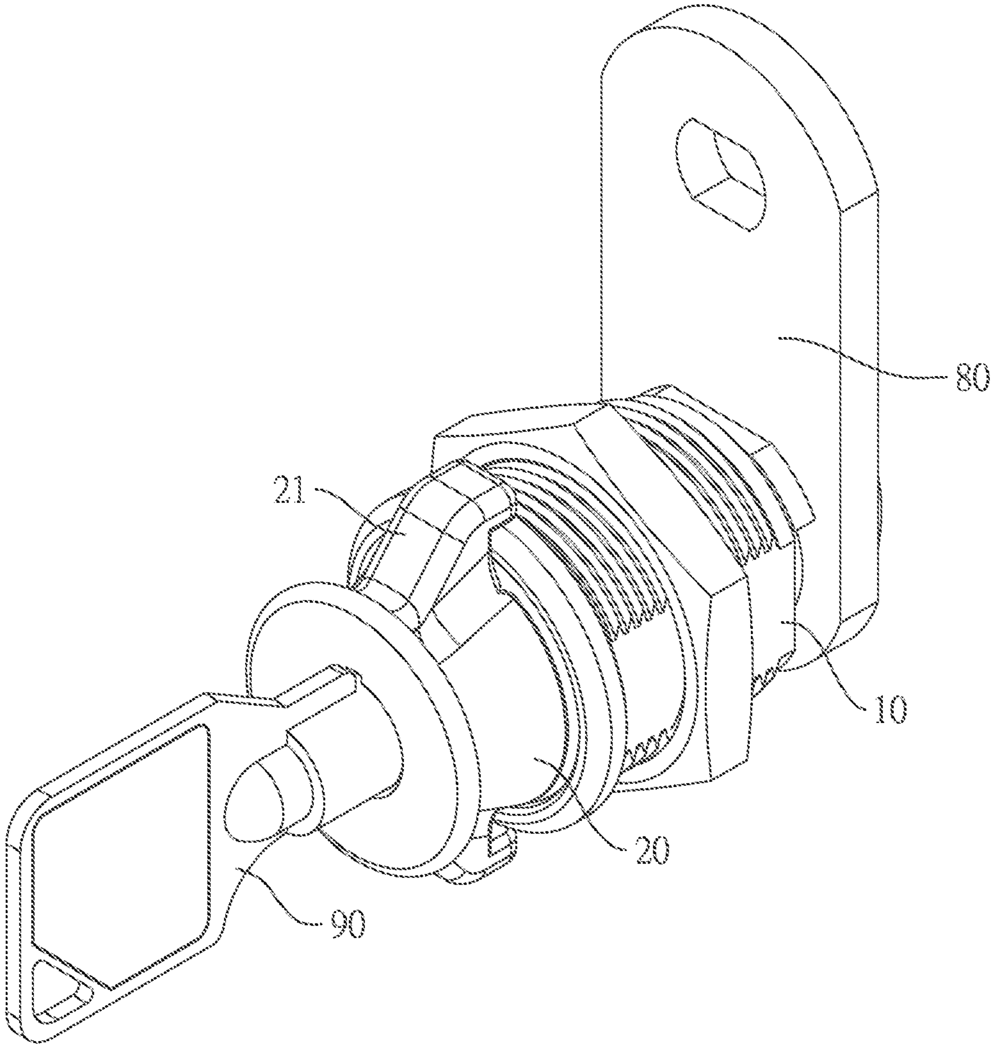
FIG. 2 is a perspective view of the tubular lock in FIG. 1, showing a key inserted into the tubular lock.
Figure 3:
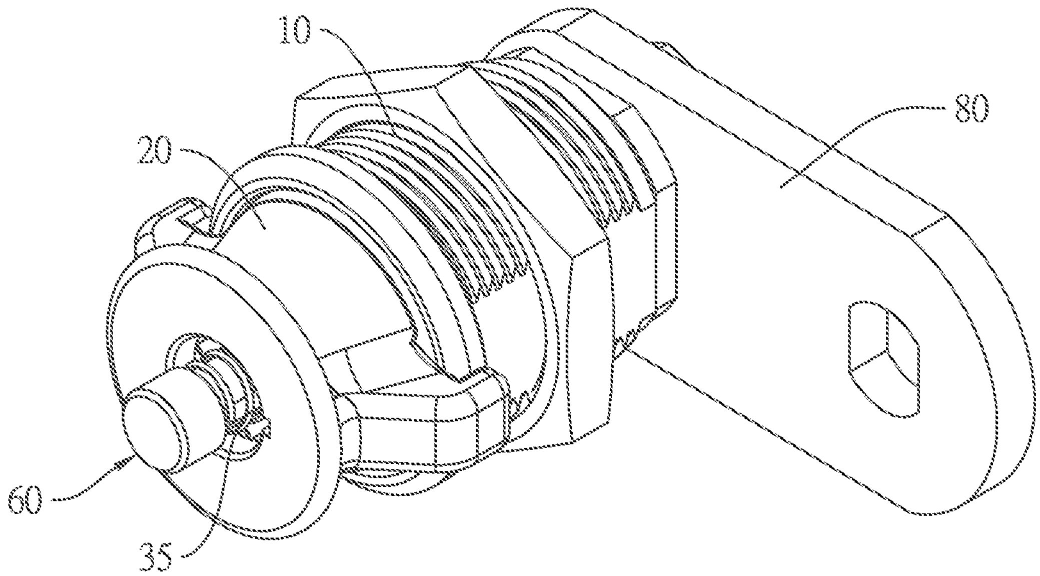
FIG. 3 is a perspective view of the tubular lock in FIG. 1, shown unlocked.
Figure 10:
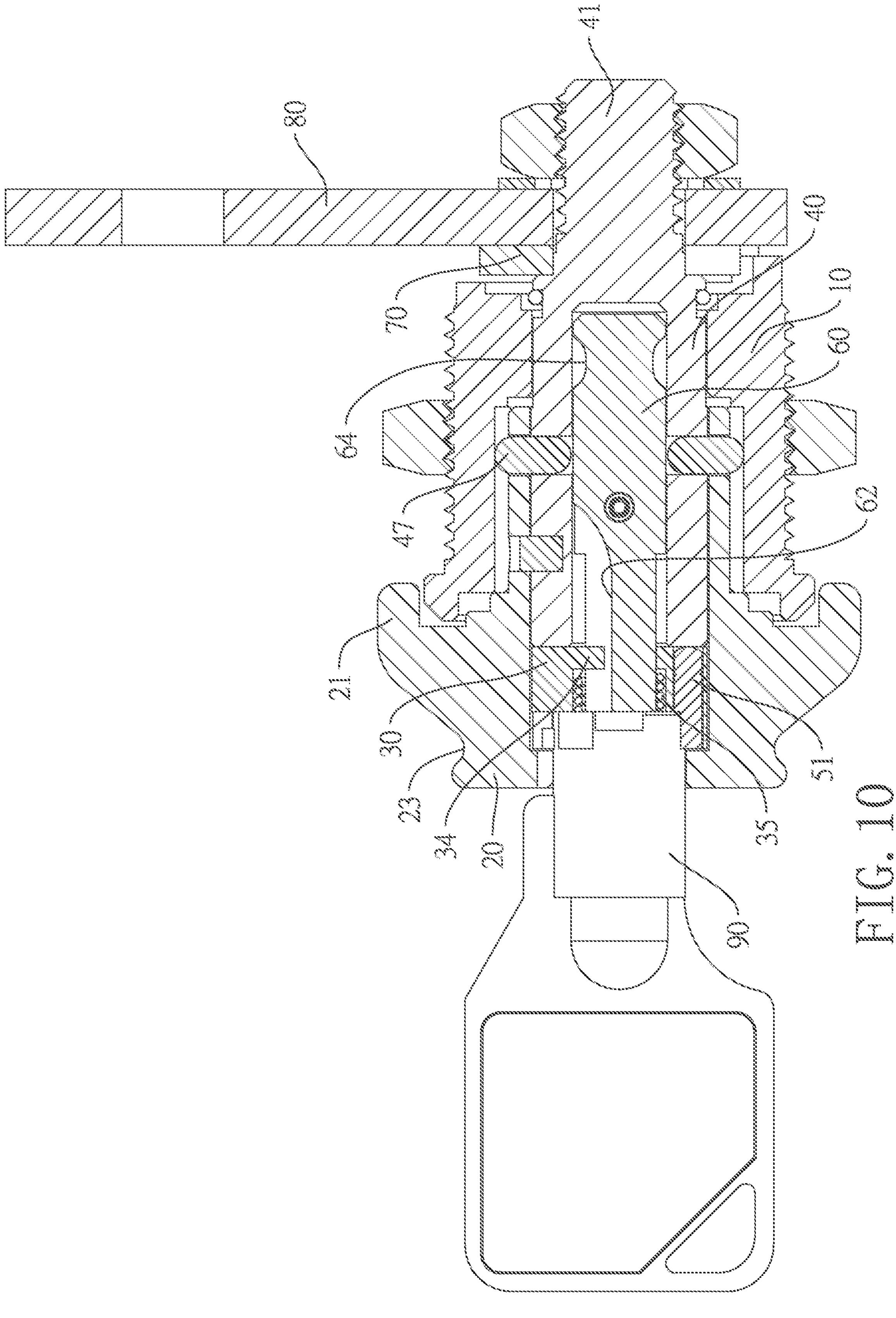
FIG. 10 is a cross-sectional front view of the tubular lock in FIG. 2, showing the key inserted into the tubular lock.
Figure 11:
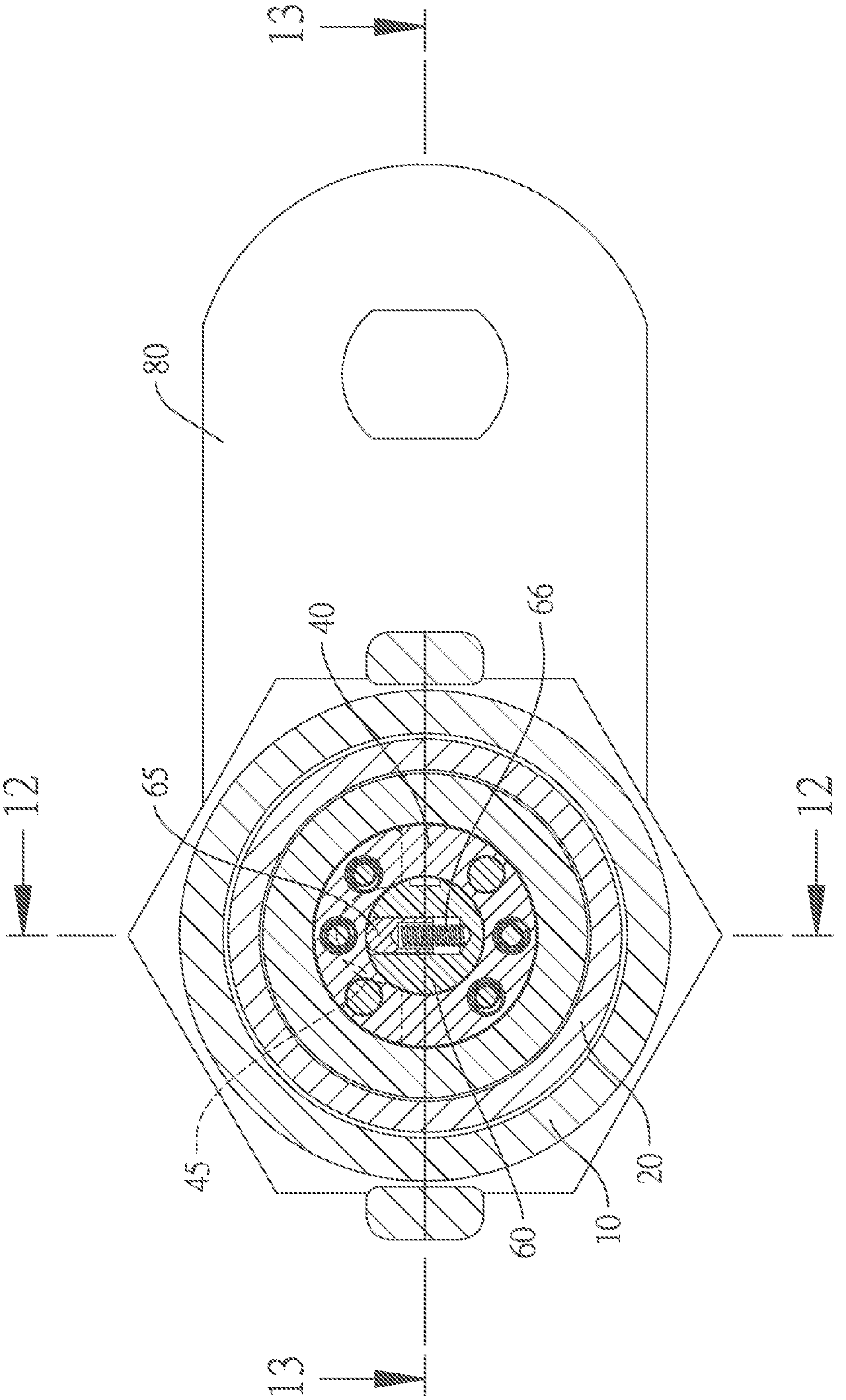
FIG. 11 is a cross-sectional front view of the tubular lock in FIG. 3, shown unlocked.
Figure 12:
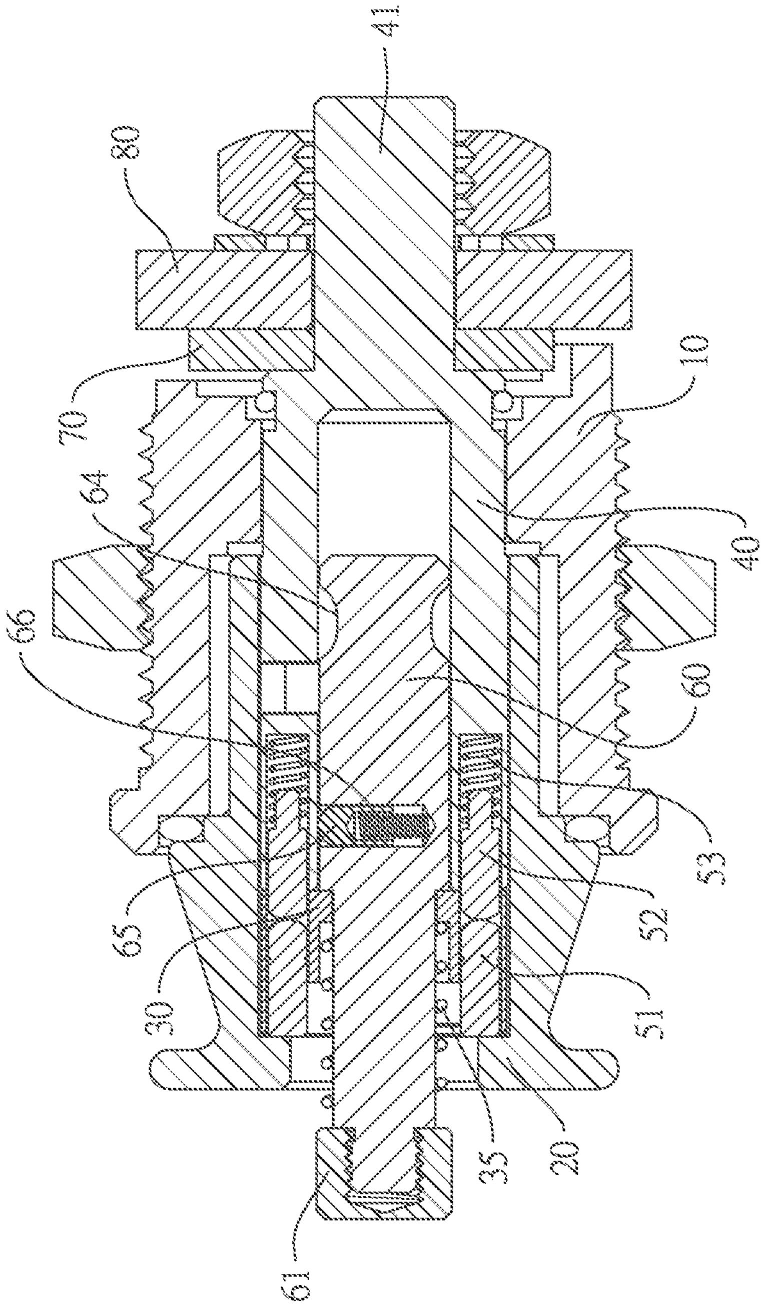
FIG. 12 is a cross-sectional side view along line 12-12 of the tubular lock in FIG. 11.
Figure 13:
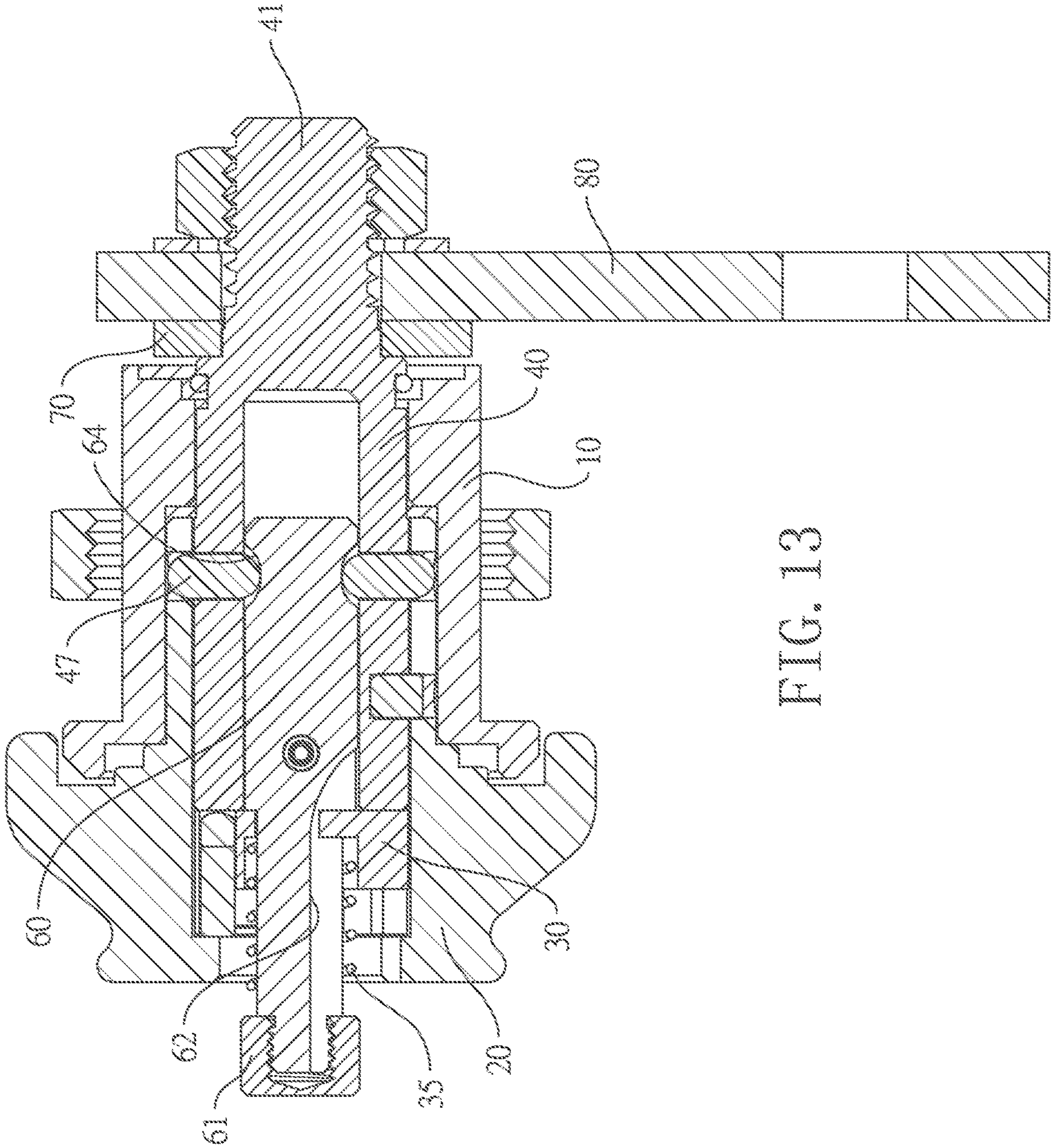
FIG. 13 is a cross-sectional side view along line 13-13 of the tubular lock in FIG. 11.

With further reference to FIGS. 2 and 10, when unlocking the tubular lock of the present invention, a key 90 is inserted into the tubular lock from the front end surface of the switching handle 20. Thus, the key 90 engages with the upper pin seat 30 and pushes the pin assemblies 50 to allow the interface between the upper pins 51 and the lower pin 52 of each of the pin assemblies 50 and the interface between the upper pin seat 30 and the lower pin seat 40 to be on the same plane.

With further reference to FIGS. 3 and 11 to 13, by turning the key 90, the upper pin seat 30 and the core shaft 60 are rotated accordingly. As the core shaft 60 rotates, the positioning pin 65 is gradually moved away from the engaging recess 45 and is pressed into the radial recess 63 of the core shaft 60 when leaving the engaging recess 45. As the positioning pin 65 leaves the engaging recess 45, resilient restoring force of the main resilient element 35 pushes the core shaft 60 to protrude forwardly to the disengaging position. Thus, the buffer annular groove 64 of the core shaft 60 corresponds in position to the at least one limiting pin 47, such that a space allowing the at least one limiting pin 47 to slide between the lock housing 10 and the core shaft 60 is formed.

Under such an unlocking state, the key 90 may be drawn from the tubular lock and stored in a proper place. Since the at least one limiting pin 47 is able to move into the buffer annular groove 64, the lower pin seat 40, the limiting ring 70 and the latch 80 can be rotated by turning the switching handle 20. The latch 80 can be selectively switched to the locking angular position and the unlocking angular position with the key 90. With the stop protrusion 12 of the lock housing 10 disposed between the two limiting protrusions 71 of the limiting ring 70, rotating directions and the rotating angle of the switching handle 20, the lower pin seat 40 and the latch 80 can be limited.

Then, by turning the switching handle 20 reversely to allow the at least one limiting pin 47 to correspond in position to the at least one positioning recess 11 of the lock housing 10 and push the core shaft 60 to allow the positioning pin 65 to correspond in position to the engaging recess 45 of the lower pin seat 40 and the radial to push the positioning pin 65 to protrude into the engaging recess 45 of the lower pin seat 40, the tubular lock of the present invention can be switched to the locking state.

The holding portion 21 of the switching handle 20 allow a user to hold and turn the switching handle 20. The outer annular groove 23 facilitates the user to pull a door, a window, or a drawer that is equipped with the tubular lock of the present invention. Moreover, by checking whether the core shaft 60 protrudes forward from or is retracted in the front end surface of the switching handle 20, the user can know whether the tubular lock is in the unlocking state or the locking state, which is able to remind the user to push the core shaft 60 to lock the tubular lock before leaving.

The tubular lock for push locking of the present invention has the following advantages. The key 90 is only needed when unlocking the tubular lock, and then the tubular lock can be locked by pushing the core shaft 60. Moreover, the tubular lock can be used to latch a pivotal mechanism, such as a window that is hinged to a window frame or a door that is hinged to a door frame. In addition, when the tubular lock is in the unlocking state, the user can switch the latch 80 to the locking angular position or the unlocking angular position by turning the switching handle 20 without using the key 90. The user only needs to lock the tubular lock before leaving. Therefore, flexibility and convenience in using the tubular lock can be efficiently improved. The user can intuitively know whether the tubular lock is in the unlocking state or the locking state by checking whether the core shaft 60 protrudes forward from or is retracted in the switching handle 20, which is able to remind the user to lock the tubular lock before leaving and to ensure the safety provided by the tubular lock.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tubular lock for push locking comprising:

a lock housing having at least one positioning recess, and the at least one positioning recess formed in an inner sidewall of the lock housing;

a switching handle having:

a rear end portion rotatably mounted in a front end portion of the lock housing; and at least one positioning hole radially formed through the rear end portion of the switching handle, and each of the at least one positioning hole of the switching handle selectively corresponding in position to one of the at least one positioning recess of the lock housing;

an upper pin seat rotatably mounted in the switching handle and disposed in a front end portion of the switching handle, and the upper pin seat having a mounting hole axially formed in the upper pin seat;

a lower pin seat mounted through a rear end portion of the lock housing and the rear end portion of the switching handle, abutting against a rear end surface of the upper pin seat and securely connected with the switching handle, and the lower pin seat having:

a receiving recess formed in a front end surface of the lower pin seat;

at least one positioning hole radially formed through the lower pin seat and communicating with the receiving recess, and each of the at least one positioning hole of the lower pin seat aligning with one of the at least one positioning hole of the switching handle; and at least one limiting pin, and each of the at least one limiting pin mounted in one of the at least one positioning hole of the lower pin seat and one of the at least one positioning hole of the switching handle that align with each other, wherein a length of each of the at least one limiting pin is longer a sum of a depth of a respective one of the at least one positioning hole of the lower pin seat and a depth of a respective one of the at least one positioning hole of the switching handle;

multiple pin assemblies mounted in the upper pin seat and the lower pin seat, and separately arranged around the mounting hole of the upper pin seat and around the receiving recess of the lower pin seat; and a core shaft slidably mounted through the receiving recess of the lower pin seat and the mounting hole of the upper pin seat, engaging with the upper pin seat and selectively engaging with the lower pin seat, and the core shaft having a buffer annular groove formed in a rear end of the core shaft, wherein a main resilient element pushes the core shaft to protrude forwardly toward the front end portion of the switching handle;

wherein when the lower pin seat is at a locking angular position and the lock core engages with the lower pin seat, the core shaft is able to disengage from the pin seat by turning the core shaft, so as to allow the main resilient element to push the core shaft to protrude out from the front end portion of the switching handle and the buffer annular groove to correspond in position to the at least one limiting pin; and when the lower pin seat is at the locking angular position and the lock core disengages from the lower pin seat, the core shaft and the lower pin seat is able to engage with each other by pushing the core shaft to compress the main resilient element.

2. The tubular lock as claimed in claim 1, wherein the upper pin seat has an aligning protrusion, and the aligning protrusion radially protruding from a hole wall defined around the mounting hole of the upper pin seat; and the core shaft has a sliding recess axially formed in an outer side surface of the core shaft and having two ends positioned toward a front end of the core shaft and a rear end of the core shaft respectively, wherein the aligning protrusion of the upper pin seat protrudes in the sliding recess.

3. The tubular lock as claimed in claim 2, wherein the lower pin seat has an engaging recess formed in an inner sidewall defined around the receiving recess of the lower pin seat, wherein a bottom defined in the engaging recess is formed as a concave surface; and the core shaft has a radial recess radially formed in the outer side surface of the core shaft and provided with a positioning pin and a radial resilient element, the radial resilient element mounted between the positioning pin and a bottom defined in the radial resilient element, and the positioning pin selectively protruding into the engaging recess of the lower pin seat.

4. The tubular lock as claimed in claim 3, wherein the upper pin seat has an axial recess formed in a front end surface of the upper pin seat, wherein the mounting hole of the upper pin seat is axially formed through a bottom defined in the axial recess;

the core shaft has a head disposed on a front end of the core shaft and mounted in the axial recess of the upper pin seat; and the main resilient element is mounted in the mounting hole and abuts against the upper pin seat and the head of the core shaft.

5. The tubular lock as claimed in claim 4, wherein the head of the core shaft is detachably mounted on the front end of the core shaft.

6. The tubular lock as claimed in claim 3, wherein the upper pin seat has multiple upper pin holes separately arranged around the mounting hole, and each of the upper pin holes is defined through a front end surface of the upper pin seat and the rear end surface of the upper pin seat, the lower pin seat has multiple lower pin recesses formed in the front end surface of the lower pin seat, separately arranged around the receiving recess, and aligning with the upper pin holes of the upper pin seat respectively; and each of the pin assemblies including an upper pin mounted in the upper pin hole; and a lower pin and an axial resilient element mounted in the lower pin recess, wherein the axial resilient element is disposed between the lower pin and a bottom defined in the lower pin recess.

7. The tubular lock as claimed in claim 3, wherein the switching handle has at least one holding portion radially protruding from an outer sidewall of the front end portion of the switching handle.

8. The tubular lock as claimed in claim 3, wherein the switching handle has an outer annular groove formed in an outer sidewall of the front end portion of the switching handle.

9. The tubular lock as claimed in claim 3, wherein the lower pin seat has a mounting end protruding out of the lock housing from a rear end surface of the lock housing; and a latch is securely mounted on the mounting end of the lower pin seat.

10. The tubular lock as claimed in claim 3, wherein the lower pin seat has a mounting end protruding out of the lock housing from a rear end surface of the lock housing;

a limiting ring is securely mounted on the mounting end of the lower pin seat and has two limiting protrusions separately protruding radially from an outer peripheral edge of the limiting ring; and the lock housing has a stop protrusion axially protruding from the rear end portion of the locking housing and disposed between the two limiting protrusions.

11. The tubular lock as claimed in claim 3, wherein the at least one positioning recess of the lock housing includes two positioning recesses that are oppositely disposed on the lock housing;

the at least one positioning hole of the switching handle includes two positioning hoes that are oppositely disposed on the switching handle; and the at least one positioning hole of the lower pin seat includes two positioning holes that are oppositely disposed on the lower pin seat;

wherein the two positioning holes of the switching handle align with the two positioning holes of the lower pin seat respectively; and by turning the switching handle, the two positioning holes of the switching handle selectively correspond in position to the two positioning recesses of the lock housing respectively.

12. The tubular lock as claimed in claim 1, wherein the lower pin seat has an engaging recess formed in an inner sidewall defined around the receiving recess of the lower pin seat, wherein a bottom defined in the engaging recess is formed as a concave surface; and the core shaft has a radial recess radially formed in the outer side surface of the core shaft and provided with a positioning pin and a radial resilient element, the radial resilient element mounted between the positioning pin and a bottom defined in the radial resilient element, and the positioning pin selectively protruding into the engaging recess of the lower pin seat.

13. The tubular lock as claimed in claim 1, wherein the upper pin seat has an axial recess formed in a front end surface of the upper pin seat, wherein the mounting hole of the upper pin seat is axially formed through a bottom defined in the axial recess;

the core shaft has a head disposed on a front end of the core shaft and mounted in the axial recess of the upper pin seat; and the main resilient element is mounted in the mounting hole and abuts against the upper pin seat and the head of the core shaft.

14. The tubular lock as claimed in claim 13, wherein the head of the core shaft is detachably mounted on the front end of the core shaft.

15. The tubular lock as claimed in claim 1, wherein the upper pin seat has multiple upper pin holes separately arranged around the mounting hole, and each of the upper pin holes is defined through a front end surface of the upper pin seat and the rear end surface of the upper pin seat, the lower pin seat has multiple lower pin recesses formed in the front end surface of the lower pin seat, separately arranged around the receiving recess, and aligning with the upper pin holes of the upper pin seat respectively; and each of the pin assemblies including an upper pin mounted in the upper pin hole; and a lower pin and an axial resilient element mounted in the lower pin recess, wherein the axial resilient element is disposed between the lower pin and a bottom defined in the lower pin recess.

16. The tubular lock as claimed in claim 1, wherein the switching handle has at least one holding portion radially protruding from an outer sidewall of the front end portion of the switching handle.

17. The tubular lock as claimed in claim 1, wherein the switching handle has an outer annular groove formed in an outer sidewall of the front end portion of the switching handle.

18. The tubular lock as claimed in claim 1, wherein the lower pin seat has a mounting end protruding out of the lock housing from a rear end surface of the lock housing; and a latch is securely mounted on the mounting end of the lower pin seat.

19. The tubular lock as claimed in claim 1, wherein the lower pin seat has a mounting end protruding out of the lock housing from a rear end surface of the lock housing;

a limiting ring is securely mounted on the mounting end of the lower pin seat and has two limiting protrusions separately protruding radially from an outer peripheral edge of the limiting ring; and the lock housing has a stop protrusion axially protruding from the rear end portion of the locking housing and disposed between the two limiting protrusions.

20. The tubular lock as claimed in claim 1, wherein the at least one positioning recess of the lock housing includes two positioning recesses that are oppositely disposed on the lock housing;

the at least one positioning hole of the switching handle includes two positioning hoes that are oppositely disposed on the switching handle; and the at least one positioning hole of the lower pin seat includes two positioning holes that are oppositely disposed on the lower pin seat;

wherein the two positioning holes of the switching handle align with the two positioning holes of the lower pin seat respectively; and by turning the switching handle, the two positioning holes of the switching handle selectively correspond in position to the two positioning recesses of the lock housing respectively.

* * * * *